US009291089B2

(12) United States Patent
Powers et al.

(10) Patent No.: US 9,291,089 B2
(45) Date of Patent: Mar. 22, 2016

(54) TURBOCHARGER HAVING COMPRESSOR COOLING ARRANGEMENT AND METHOD

(71) Applicant: Caterpillar Inc., Peoria, IL (US)

(72) Inventors: Gary Powers, Lafayette, IN (US); Cody McKinley, Indianapolis, IN (US); Dan Vacek, Darien, IL (US); Muhamad Baihaqi Haji Ismail, Kuala Lumpur (MY); Kumar Nale, Lafayette, IN (US); Jeffrey McCormack, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 14/013,649

(22) Filed: Aug. 29, 2013

(65) Prior Publication Data

US 2014/0060039 A1    Mar. 6, 2014

Related U.S. Application Data

(60) Provisional application No. 61/695,802, filed on Aug. 31, 2012.

(51) Int. Cl.
| | |
|---|---|
| *F02B 29/04* | (2006.01) |
| *F02D 23/00* | (2006.01) |
| *F02B 33/44* | (2006.01) |
| *F02K 1/38* | (2006.01) |
| *F02K 1/46* | (2006.01) |
| *F01D 25/12* | (2006.01) |
| *F02B 37/007* | (2006.01) |

(Continued)

(52) U.S. Cl.
CPC ............. *F02B 29/04* (2013.01); *F02B 29/0475* (2013.01); *F01D 25/12* (2013.01); *F02B 37/007* (2013.01); *F02B 37/013* (2013.01); *F02B 37/16* (2013.01); *Y02T 10/146* (2013.01)

(58) Field of Classification Search
CPC ........ F01D 25/12; F02B 29/04; F02B 29/0475; F02B 37/007; F02B 37/013; F02B 37/16
USPC .................................... 60/599, 606, 262, 611
See application file for complete search history.

(56) References Cited

U.S. PATENT DOCUMENTS 3,370,417 A * 2/1968 Koziara .......................... 60/611
4,689,960 A * 9/1987 Schroder et al. ................ 60/607

(Continued)

FOREIGN PATENT DOCUMENTS

| JP | 04112957 A * | 4/1992 | ............. F02M 25/07 |
| WO | 0079117 | 12/2000 | |

OTHER PUBLICATIONS

JP 04112957 translated by The Mcelroy Translation Company, Aug. 2009.*

*Primary Examiner* — Jorge Pereiro
*Assistant Examiner* — Deming Wan
(74) *Attorney, Agent, or Firm* — Leydig, Voit & Mayer, Ltd.

(57) ABSTRACT

A compressor adapted to compress a working fluid includes a housing surrounding a compressor wheel and a backplate connected to the housing and enclosing the compressor wheel within an interior space of the housing. A cooling fluid conduit is fluidly connected between a cooled and compressed source of working fluid downstream of the compressor and the interior space of the housing of the compressor at a location between the compressor wheel and the back plate. A pressure differential created when the compressor is operating draws a flow of cooled, compressed charge into the interior space of the housing, which flow passes over and convectively cools said compressor wheel before mixing with a main compressor flow and being provided back through the compressor outlet.

18 Claims, 7 Drawing Sheets

(51) Int. Cl.
*F02B 37/013* (2006.01)
*F02B 37/16* (2006.01)

(56) References Cited

U.S. PATENT DOCUMENTS

| | | | |
|---|---|---|---|
| 5,064,423 A * | 11/1991 | Lorenz | B60T 17/02 123/586 |
| 5,406,796 A * | 4/1995 | Hiereth et al. | 60/605.2 |
| 5,544,486 A | 8/1996 | Lu | |
| 6,190,123 B1 | 2/2001 | Wunderwald et al. | |
| 6,238,179 B1 | 5/2001 | Wunderwald et al. | |
| 6,257,834 B1 | 7/2001 | Bremer et al. | |
| 6,363,721 B1 * | 4/2002 | Prenninger et al. | 60/611 |
| 6,416,281 B1 | 7/2002 | Bremer et al. | |
| 6,543,428 B1 | 4/2003 | Blandino et al. | |
| 6,701,710 B1 * | 3/2004 | Ahrens | F02B 37/00 123/564 |
| 2006/0123785 A1 | 6/2006 | Sundin et al. | |
| 2009/0126363 A1 | 5/2009 | Arnold et al. | |
| 2012/0003081 A1 | 1/2012 | Woollenweber | |

* cited by examiner

TURBOCHARGER HAVING COMPRESSOR COOLING ARRANGEMENT AND METHOD

CROSS-REFERENCE TO RELATED APPLICATIONS

This patent application claims the benefit of U.S. Provisional Patent Application No. 61/695,802, filed Aug. 31, 2012, which is incorporated herein in its entirety by this reference.

TECHNICAL FIELD

This patent disclosure relates generally to air compressors and, more particularly, to air compressors in turbochargers for internal combustion engines.

BACKGROUND

In conventional air compressors such as those used on internal combustion engines, exhaust gas energy is used to compress engine intake air. In certain other applications, so called superchargers are driven directly with mechanical engine power or an electric motor to compress air that is then provided pressurized to engine cylinders. In other applications, so called turbochargers are used, which include a turbine that receives pressurized exhaust gas from the engine. The exhaust gas passes through a scrolled passage of the turbine and impinges onto a turbine wheel causing it to turn. The turbine wheel is connected to a shaft, which is connected to a compressor wheel disposed in a compressor housing. The powered rotation of the turbine wheel and shaft operate to turn the compressor wheel, which draws air into a compressor housing having a scrolled shape and compresses it.

Various types, sizes and numbers of turbochargers and/or superchargers have been used on engines in the past. One design consideration when selecting an appropriate compressor for an engine application is the air flow rate and desired pressure ratio of engine intake air that is desired. Further, because air compression increases air temperature, engines typically use heat exchangers, such as air-to-air heat exchangers, to cool the compressed air before it is provided to the engine.

The materials used to construct engine compressor components are selected by consideration of cost and operating parameters. For example, while a forged aluminum compressor wheel is relatively cost beneficial, it may be unsuitable for applications in which the compressed air temperature is or is expected to rise above a threshold value during operation. Other, more expensive, materials that have been used in the past to construct compressor wheels that can withstand higher operating temperatures include Inconel(R), which is a family of alloys for high temperature applications, titanium alloys and the like. Such materials are not only expensive to purchase but are also difficult to form and to machine. However, use of such materials for high temperature applications is common because use of another material, for example, aluminum, in high temperature applications, for example, compressor outlet air temperatures of 220° C. or more, may lead to premature component failures and costly repairs. This is especially true for engine applications operating close to the margins of their operating parameters such as engine applications used at very high altitudes, for example, at 15,000 feet above sea level and/or high ambient temperatures, for example, exceeding about 110° F. (about 43.3° C.).

SUMMARY OF THE DISCLOSURE

In one aspect, the disclosure describes an internal combustion engine. The internal combustion engine includes an intake collector and an exhaust collector selectively fluidly connected to an engine cylinder. The internal combustion engine further includes a compressor adapted to compress air or a mixture of air and to provide a compressed charge to the intake collector. The compressor includes a housing surrounding a compressor wheel and a backplate connected to the housing and enclosing the compressor wheel within an interior space of the housing. A heat exchanger is adapted to cool the compressed charge provided to the intake collector. The heat exchanger is disposed between the compressor and the intake collector such that the intake collector is disposed downstream of the heat exchanger in the direction of flow of the compressed charge from the compressor to the intake collector. A charge air conduit fluidly interconnects the heat exchanger with the intake collector.

In one embodiment, a cooling fluid conduit is fluidly connected between the charge air conduit and the interior space of the housing of the compressor at a location between the compressor wheel and the back plate. A pressure differential created when the compressor is operating draws a flow of compressed charge into the interior space of the housing from the charge air conduit. The flow passes over and convectively cools the compressor wheel. The flow mixes with a main compressor flow and is provided back to the heat exchanger.

In another aspect, the disclosure describes a turbocharger for use with an internal combustion engine. The turbocharger is interconnected between an intake collector and an exhaust collector of the internal combustion engine. The turbocharger includes a turbine and a compressor associated with the turbine. The compressor is adapted to compress air or a mixture of air, and to provide a compressed charge to the intake collector. The compressor includes a housing radially surrounding a compressor wheel and a backplate connected to the housing and enclosing the compressor wheel within an interior space of the housing. A cooling fluid conduit is fluidly connected to the backplate of the compressor at a location between the compressor wheel and the back plate. The cooling fluid conduit is adapted to provide a portion of the compressed charge from the compressor back to the compressor through the backplate due to a pressure differential that is created between the location behind the compressor wheel and an outlet of the compressor. When the compressor is operating, a flow of compressed charge is drawn into the interior space of the housing. The flow passes over and convectively cools the compressor wheel before being mixed with a main compressor flow and provided back through the compressor outlet.

In yet another aspect, the disclosure describes a method for cooling a compressor wheel within a fluid compressor during compressor operation. The method includes cooling a portion of the compressed working fluid of the compressor, and diverting the portion of compressed working fluid that was cooled to form a cooling flow. The cooling flow is provided back to the compressor and routed through a conduit into a compressor housing through a backplate of the compressor housing at a low pressure region behind the compressor wheel. A fluid cavity within the interior of the compressor adjacent the compressor wheel is filled with cooling fluid from the cooling flow. Such cooling fluid then convectively cools the compressor wheel.

DETAILED DESCRIPTION

This disclosure relates to air compressors and, specifically, to structures and methods for compressor impeller or compressor wheel cooling during operation, where the cooling media employed is the working fluid of the compressor. In one disclosed embodiment, the compressor is a mechanically or turbine driven air compressor in an internal combustion engine. The disclosed compressor embodiments have a typical construction that includes a compressor wheel having generally radially extending vanes. The compressor wheel is connected to a shaft, which rotates under power provided by a turbine or other mechanical or electrical means. The compressor wheel rotates within a housing having a scrolled passage extending therethrough such that air entering the compressor housing via a central passage is radially directed into the scrolled housing, which increases the speed, pressure and temperature of the air. In the disclosed embodiments, the compressed air provided by the compressor is cooled in a heat exchanger before a relatively small portion thereof is provided back to the compressor to convectively cool the compressor wheel. In one embodiment, the cooling air is provided through the compressor back-plate so as to impinge onto the back or inboard side of the rotating compressor wheel. Such a compressor arrangement has applicability in any application in that no fluids other than the working fluid of the compressor is used for cooling, which eliminates concerns of fluid mixing of leaking within the compressor. The embodiments disclosed herein relate to compressors that are arranged with a turbine on an internal combustion engine, but should not be considered as limiting to the structure or application of the compressor structures and methods described herein.

Figure 1:
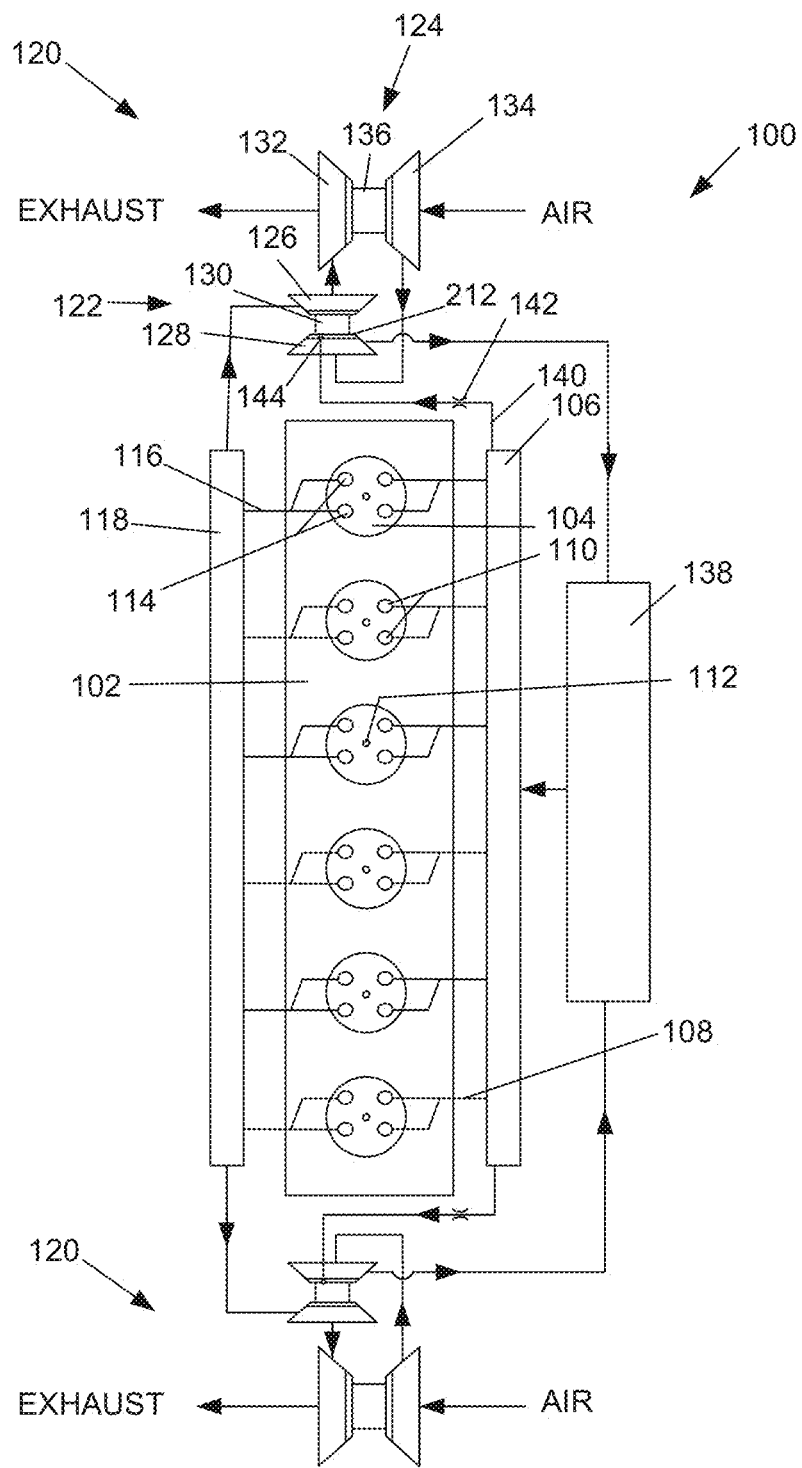
FIG. 1 is a block diagram for an engine in accordance with the disclosure.

More specifically, a block diagram for an engine 100 that embodies aspects of the present disclosure is shown in FIG. 1. The engine 100 includes a cylinder case 102 that forms a plurality of cylinders 104. Although six cylinders 104 are shown in an inline arrangement, fewer or more cylinders arranged in a different configuration within different cylinder case portions such as in a V-configuration may be used. Although not shown here and discussed in detail for brevity, each cylinder 104 can include a reciprocable piston connected to a common crankshaft. The combustion of a fuel and air mixture in the cylinders in the known fashion produces useable engine power. Air, or a mixture of air with exhaust gas, is provided in the known fashion to the cylinders 104 during operation from an intake manifold or collector 106, which is selectively fluidly connectable with each cylinder 104 via a respective intake runner 108 that provides compressed air to the cylinder 104 when intake valves 110 are open. The compressed air, along with fuel provided to the cylinder 104, for example, through a fuel injector 112, forms a combustible mixture that ignites when compressed or in the presence of a spark. Combustion byproducts are evacuated from each cylinder 104 through exhaust valves 114 and exhaust runners 116. The exhaust gas from each cylinder 104 is collected in an exhaust manifold or collector 118.

In typical engines, the engine intake air mixture in the intake collector 106, as well as the exhaust gas in the exhaust collector 118, are under pressure. To provide the power used to compress the intake air mixture, different engine applications may use one or more different devices. For example, some engines use devices commonly referred to as superchargers, which are air compressors operated by mechanical power provided by the engine's crankshaft, electrical power provided by a motor and the like. In the illustrated embodiment, the compressed air mixture in the intake manifold is provided by two sets of staged turbochargers. More specifically, the engine 100 includes two sets of staged turbochargers 120. The two staged turbocharger sets 120 are similar, so one will be described in detail.

Accordingly, each staged turbocharger set 120 includes a high-pressure turbocharger 122 and a low-pressure turbocharger 124 connected in series circuit connection. The high-pressure turbocharger 122 includes a high-pressure turbine 126 and a high-pressure compressor 128, which are connected to one another by a center housing 130 in the known fashion. The low-pressure turbocharger 124 similarly includes a low-pressure turbine 132 and a low-pressure compressor 134 that are connected via a center housing 136. In this arrangement, which is one of many possible turbocharger configurations, the high-pressure turbine 126 is fluidly connected to the exhaust collector 118 and arranged to receive pressurized exhaust gas therefrom. Exhaust gas exiting the high-pressure turbine 126 is provided to the low-pressure turbine 132, which has a larger frame size than the high-pressure turbine 126, such that additional expansion of the exhaust gas can be accomplished to extract additional work therefrom. Exhaust gas exiting the low-pressure turbine 132 can be provided to exhaust treatment devices and systems in the known fashion. The flow of exhaust gas through these devices is designated by arrows in FIG. 1.

To provide compressed air to the engine, air is provided to the low-pressure compressor 134, where it is compressed to a first pressure. Air at the first pressure is then provided from the low-pressure compressor 134 to the high-pressure compressor 128, where its pressure (and temperature) are increased. The flow path of air through the low- and high-pressure compressors 134 and 128 is designated by arrows in FIG. 1, while other components and systems such as filters and sensors disposed along the air path are omitted for simplicity.

As can be appreciated, the staged compression of air in the engine 100 shown in FIG. 1 is one of many different methods employed in internal combustion engines. For example, a single turbocharger can be used or more than two turbochargers can be used in each staged set 120. Moreover, one or both turbochargers in each set can be replaced by a mechanically or electrically driven compressor or supercharger. Additionally, hybrid systems such as turbochargers with electrically, hydraulic or pneumatic assist mechanisms may be used.

In the illustrated embodiment, the compressed air charge from each high-pressure compressor 128 is cooled before being provided to the intake collector 106. To cool the intake charge, the compressed air from the high-pressure compressors 128 is provided to an air-to-air or to an air-to-water charge air cooler (CAC) 138, which is embodied as a heat exchanger configured to remove heat from the engine intake air and release the heat to ambient air, which is typically forced through baffles in the CAC 138 by a fan (not shown). Depending on the size of the CAC, the flow rate of engine intake air, ambient and engine intake air temperatures, and the like, the temperature of engine intake air can be reduced to be within an acceptable range with respect to ambient air temperature.

Air from the intake collector 106 is provided to each combustion cylinder 104 during operation. In the illustrated embodiment, however, to provide sufficient engine intake air at a sufficient pressure, the intake air may be compressed beyond the limitations of certain materials used to construct components of the turbochargers, and especially the impeller or wheel within each of the high-pressure compressors 128. For example, temperatures of 240° C. or more may be present, especially when the engine 100 operates for prolonged periods at high altitudes and/or under high ambient temperature conditions. Such compressor operating temperatures would typically necessitate use of an exotic material, such as Inconel (R) or a titanium alloy, for constructing the high-pressure compressor wheel, which would increase the cost of the high-pressure compressor. However, in the illustrated embodiment, the high-pressure compressor wheels can be constructed out of a more conventional material such as aluminum, which can withstand the relatively high compressor operating temperatures because it is cooled such that, even though the working fluid exiting the compressor is at about 240° C. or more, the temperature of the compressor wheel at certain high-stress areas can be maintained at about 200° C. or below.

Figure 2:
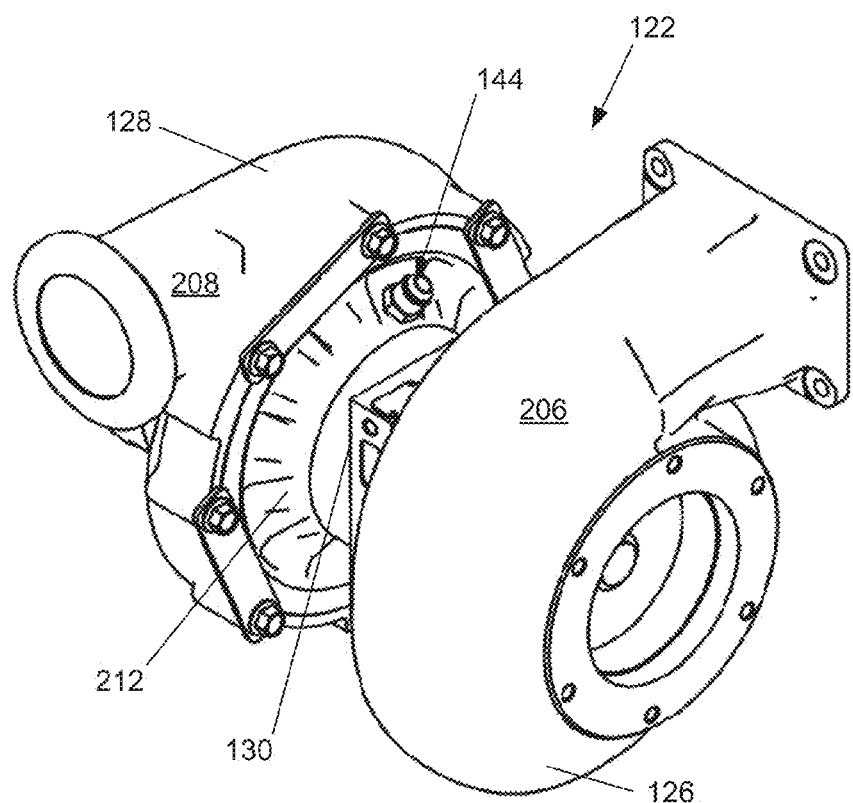
FIGS. 2 and 3 are outline views of a turbocharger from different perspectives in accordance with the disclosure.
Figure 3:
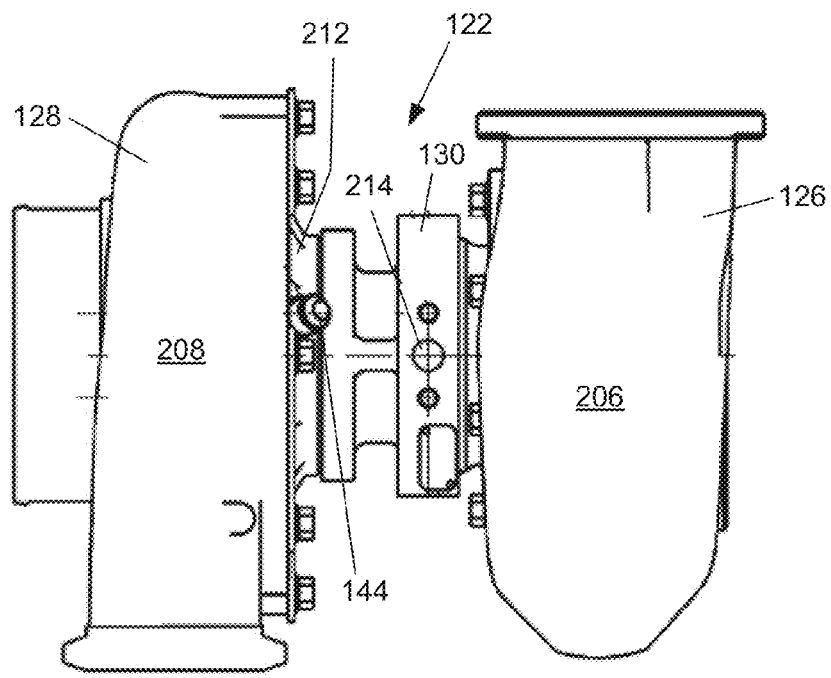
Figure 4:
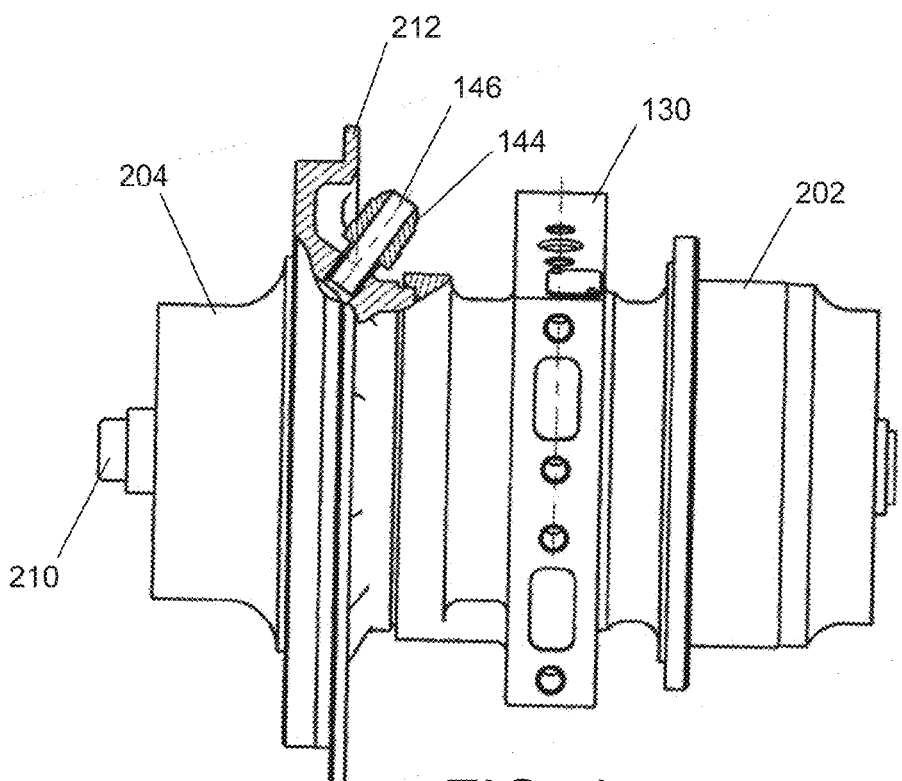
FIG. 4 is a partial breakaway view of a turbocharger in accordance with the disclosure with compressor and turbine housings removed.

More particularly, the engine 100 includes an active air-cooling system for cooling the high-pressure compressor wheels. Each of FIGS. 2 and 3 illustrates an outline view of a high-pressure compressor. FIG. 4 is an outline view of the high-pressure compressor with the turbine housing 206 and the compressor housing 208 removed to reveal the turbine wheel 202 and the compressor wheel 204, which are connected on opposite ends of a shaft 210. The shaft 210 extends through the center housing 130, as shown in FIG. 4, in the known fashion. When the compressor is assembled, a compressor back-plate 212 extends around the shaft 210 and is connected to the center housing 130 such that the compressor wheel 204 and center housing 130 are on opposite sides of the back plate 212. The compressor housing 208 is connected to the back-plate 212 to radially enclose the compressor wheel 204. The turbine 126 has a similar arrangement. The center housing 130 includes other structures, such as bearings, which are lubricated and which limit axial motion of the shaft 210 along its centerline due to thrust loadings on the turbine and compressor wheels 202 and 204 during operation. The center housing 130 has an internal gallery (not shown) through which oil is provided via oil supply opening 214. Oil in the gallery drains back to the cylinder case 102 of the engine.

In reference to these figures, along with FIG. 1, the engine 100 includes a cooling air conduit 140 that is fluidly connected to the intake air system and, particularly, to the intake collector 106 downstream of the CAC 138. A flow of air in the cooling air conduit 140 from the intake collector 106 is provided to the high-pressure compressor 128 for cooling the compressor wheel 204. As can be appreciated, the air temperature in the intake collector 106 has a reduced temperature compared to the air temperature within the compressor 128 due to the cooling function provided by the CAC 138. Use of a CAC is optional and may not be required in certain applications. Moreover, by selecting an appropriate low-pressure region within the compressor housing 208 into which to provide the cooling air, a pressure differential is created that will drive the cooling flow of air through the cooling air conduit 140 and into the compressor housing 208. In one embodiment, the cooling air conduit 140 does not contain active air flow control devices, which is advantageous in reducing cost and complexity in the engine system. To control the flow of air passing through the cooling air conduit 140, such that sufficient cooling air passes through the conduit while allowing sufficient air for proper engine operation under all operating conditions, a flow control orifice 142 (FIG. 1) may be used along the cooling air conduit 140. The flow control orifice 142 may be an equivalent flow orifice integrated into the shape, size and routing of the cooling air conduit 140, or may alternatively be a controlled flow diameter in a component associated with the cooling air conduit 140 such as an end fitting or tube section diameter. The percentage of the total working fluid flow that can be diverted to cool the compressor wheel in this fashion depends on the requirements of the engine and, specifically, the air reduction the engine can tolerate without loss of engine power. In the illustrated embodiments, it was determined that a maximum of 5% of the compressor air flow can be diverted for use in cooling the compressor wheel. By analysis, it was determined that about 2% of the compressor air flow will be sufficient to provide acceptable compressor wheel cooling. In one embodiment, the cooling air flow was even less at about 1.8% of the total compressor air flow.

Figure 5:
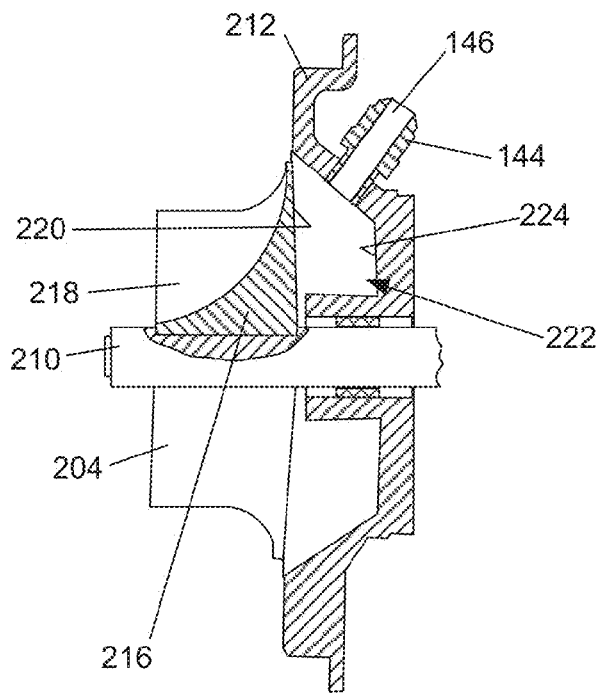
FIG. 5 is a cross section of a compressor back-plate for a turbocharger in accordance with the disclosure.

In the illustrated embodiment, the cooling air conduit 140 is connected by a fitting 144 to the compressor back-plate 212. When the cooling system is added to an existing engine, the fitting 144 may be inserted into a hole that is drilled and tapped into the compressor back plate. A similar fitting can be added to the intake collector of the engine for supplying the air to the compressor or, alternatively, an existing fitting of the intake collector may be used. As previously described, the compressor back-plate 212 is connected to the center housing 130 and is disposed adjacent the compressor wheel 204. As shown in the cross section of FIG. 5, the compressor wheel 204 includes a generally conical hub 216 that supports a plurality of radially extending blades 218. The hub 216 forms a base or inboard-facing disk-shaped surface 220, which faces the back-plate 212. A radially extending channel or cavity 222 is defined between the base surface 220 of the compressor wheel 204 and an inner surface 224 of the back-plate 212. As shown in FIG. 5, the cavity 222 extends peripherally around the shaft 210 and is exposed to a majority of the outer peripheral portions of the base surface 220 of the compressor wheel 204. An internal passage 146 of the fitting 144 is fluidly open to the cavity 222 such that direct fluid communication is established between the cavity 222 and the intake collector 106 (FIG. 1) through the cooling air conduit 140. The internal passage 146 is generally straight and, in the illustrated embodiment, is disposed at an angle of about 55 degrees from the centerline of the shaft 210 and in a radial location relative to the shaft centerline that allows the cooling air to enter the cavity 222. In this way, during engine operation, compressed and cooled air from the intake collector 106 is provided to the cavity 222. This cooling air flow is driven by a pressure difference between the intake collector 106 and the cavity 222. For example, in one operating condition on a test conducted on-engine, the cooling airflow was selected to be about 2% of the total airflow of the compressor, had a temperature of about 100° C., and was driven by a pressure difference across the ends of the cooling fluid conduit of about 35 psig. In other implementations, a cooling airflow of about 1.8% was selected.

Figure 6:
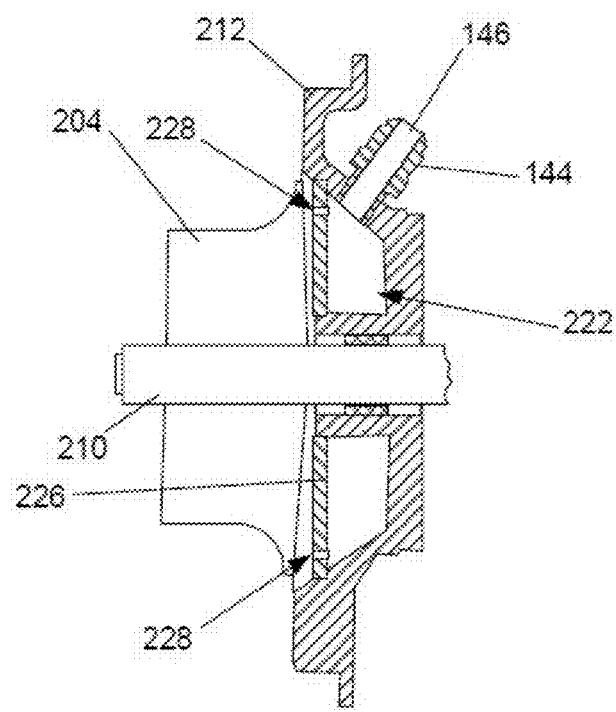
FIG. 6 is a cross section of an alternative embodiment for a compressor back-plate for a turbocharger in accordance with the disclosure.
Figure 7:
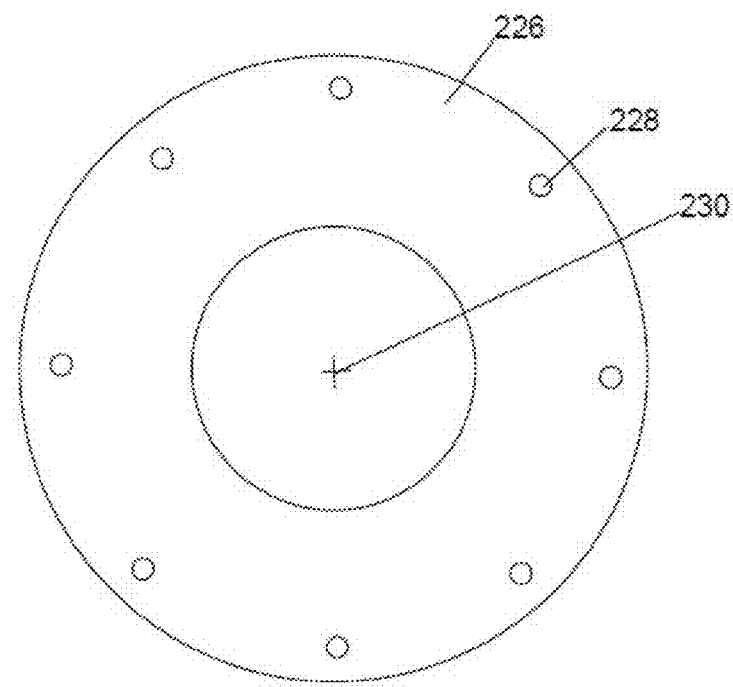
FIG. 7 is an outline view of a disk having air openings in accordance with the disclosure.

An alternative embodiment is shown in FIGS. 6 and 7. In this embodiment, a disk 226 having a plurality of air nozzles or openings 228 formed therein is disposed within the cavity 222 to direct air towards targeted locations on the base surface 220 of the compressor wheel 204. More specifically, the disk 226 has a generally annular shape and is disposed adjacent the compressor wheel 204 to cover the annular cavity 222. The openings 228 are formed at regular intervals peripherally around the disk 226 at the same radial distance from a center of the disk 230, which in the installed condition substantially coincides with the centerline of the shaft 210 (FIG. 5). With the disk 226 installed, the cooling airflow entering the cavity 222 through the internal passage 146 of the fitting 144 is directed through the openings 228 to impinge onto a particular area of the surface 220 that has been determined to be an area of high stress in the compressor wheel 204. Such determination may be made empirically or numerically.

Figure 8:
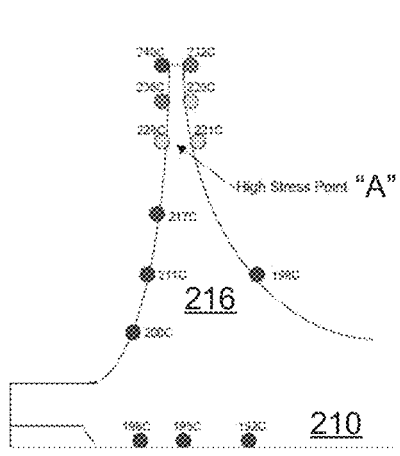
FIGS. 8, 9 and 10 are thermal distribution diagrams for a compressor wheel under representative operating conditions of an engine.
Figure 9:
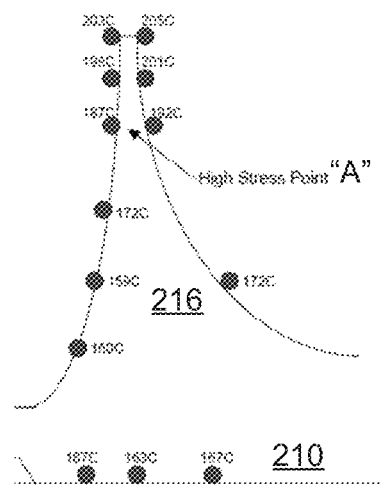

Two temperature plots illustrating an experimentally determined temperature distribution along the hub 216 of the compressor wheel 204 (FIG. 5) showing the baseline and cooled temperatures of the compressor wheel 204 during operation are shown in FIGS. 8 and 9. In FIG. 8, a baseline temperature measurement at various radial and axial locations on the compressor wheel hub 216 was conducted. As can be seen from the graph shown in FIG. 8, for a particular operating condition in which the compressor discharge air temperature was about 284° C. at a pressure of 33 psig, the temperature of the shaft was between 192 and 198° C., and the temperature of the hub close to the shaft was about 200° C. As the radial distance from the hub 216 increases, the temperature of the hub steadily increased until it reached a temperature of about 240° C. on the inboard side of the outer most periphery thereof, and a temperature of about 232° C. on the outboard side thereof. This information was used in a computational model, which indicated that a high stress point, A, existed at a radial distance from the shaft 210 that is about ¾ of the total outermost radius of the hub 216 with respect to the shaft 210. These temperatures were found to exceed the design parameters for the material used to construct the compressor wheel at that operating condition. As a result, the compressor wheel may be expected to deform permanently originating around the high stress point, which can cause imbalances in the rotor dynamics and failures.

Figure 10:
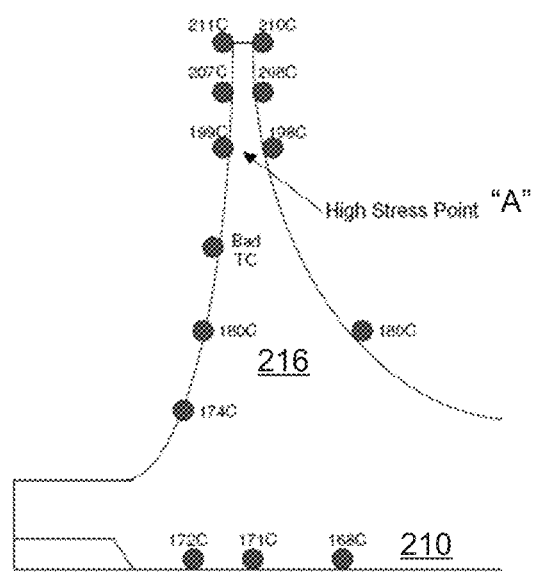

A test under the same conditions was repeated using a compressor with the disk 226 installed as previously discussed. In this arrangement, the radial location of the openings 228 was selected to coincide with the point of high stress, A. The results of the test are shown in the thermal chart shown in FIG. 9. Here, the cooling air flow provided to the cavity 222 (FIG. 6) was about 24 SCFM at a pressure of about 22.2 psig and a temperature of about 48° C. The temperature measurements taken on the hub 216 indicated a drop of about 30° C. in the shaft 210, a drop of about 40° C. in the hub along an area adjacent the shaft, and a gradual temperature decrease throughout the hub such that the hub inboard tip temperature dropped to about 203° C. from the baseline temperature of 240° C. on the inboard side, and to about 205° C. from the baseline 232° C. baseline temperature on the outboard side. In other words, an overall temperature reduction across the entire hub 216 was noticed, which was sufficient to bring the temperature at the high stress point, A, within design parameters for the material used to construct the compressor wheel. Subsequent tests conducted without the disk 226 indicated that the effect of the disk 226 is relatively small to the cooling of the hub 216, thus enabling the omission of the disk from the compressor and a realization of cost and complexity savings for the system. A thermal graph for a representative test is shown in FIG. 10, in which the tip temperature of the hub 216, using cooling air at about 101° C., at a pressure of about 33 psig and a flow rate of about 14.8 SCFM, was 211° C. on the inboard side and about 210° C. on the outboard side of the hub 216.

Figure 11:
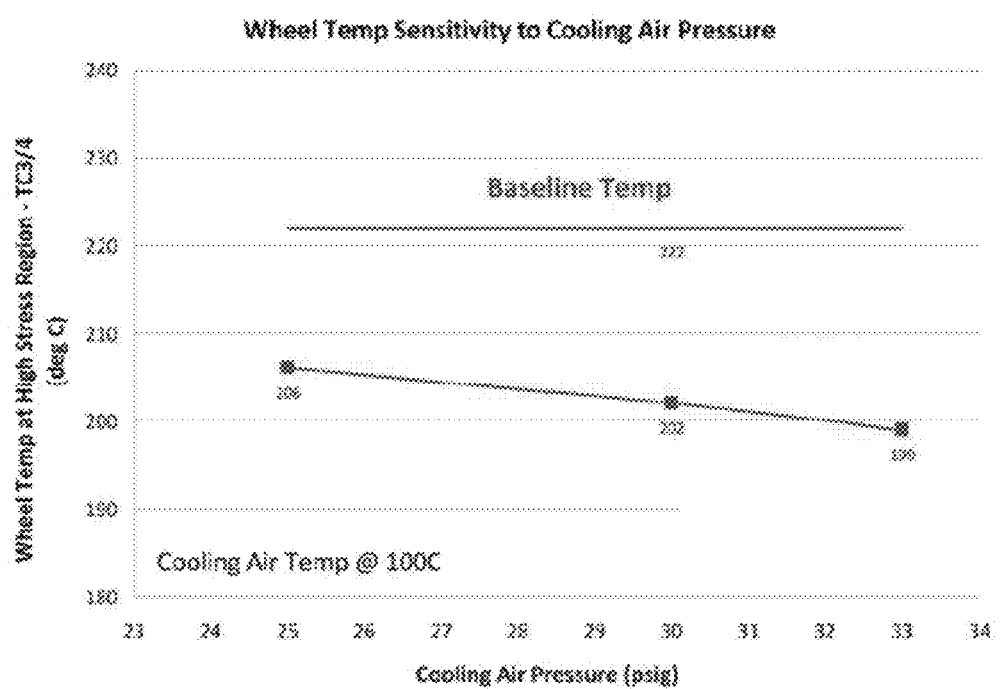
FIG. 11 is a temperature map for a compressor cooling arrangement in accordance with the disclosure.

A graph showing a series of tests conducted to determine system sensitivity to cooling with respect to cooling air pressure is shown in FIG. 11. Here, cooling air pressure (psig) is plotted along the horizontal axis, and the temperature (° C.) of the hub 216 at the high stress region, A (FIG. 8), is plotted against the vertical axis. In the selected test condition of a temperature of 222° C. at the region A, and using a cooling air temperature of about 100° C., the temperature at the high stress region indicated an almost linear decline from 206° C. to about 199° C. for a cooling air pressure increase from 25 psig to about 33 psig.

INDUSTRIAL APPLICABILITY

The present disclosure is applicable not only to compressors used with internal combustion engines, but to any radial vane compressors having wheels prone to thermal stresses. The disclosed systems and methods advantageously use the compressor working fluid as the cooling medium, thus obviating concerns about cooling fluid mixing with the working fluid or leaking into the compressor housing and contaminating the working fluid. For example, in compressors used for natural or petroleum gas, a portion of the working fluid may be diverted from the compressor outlet, cooled, and reintroduced into the compressor housing behind the compressor wheel, as previously described, to provide a desired cooling. Moreover, the relatively simple implementation of the cooling air conduit, especially on internal combustion engines having intake air coolers, enables the effective and efficient retrofit of existing engine systems in the event those systems will be operating in harsh environments, which would otherwise have required an equipment upgrade such as compressor wheels made of more exotic materials and alloys.

Figure 12:
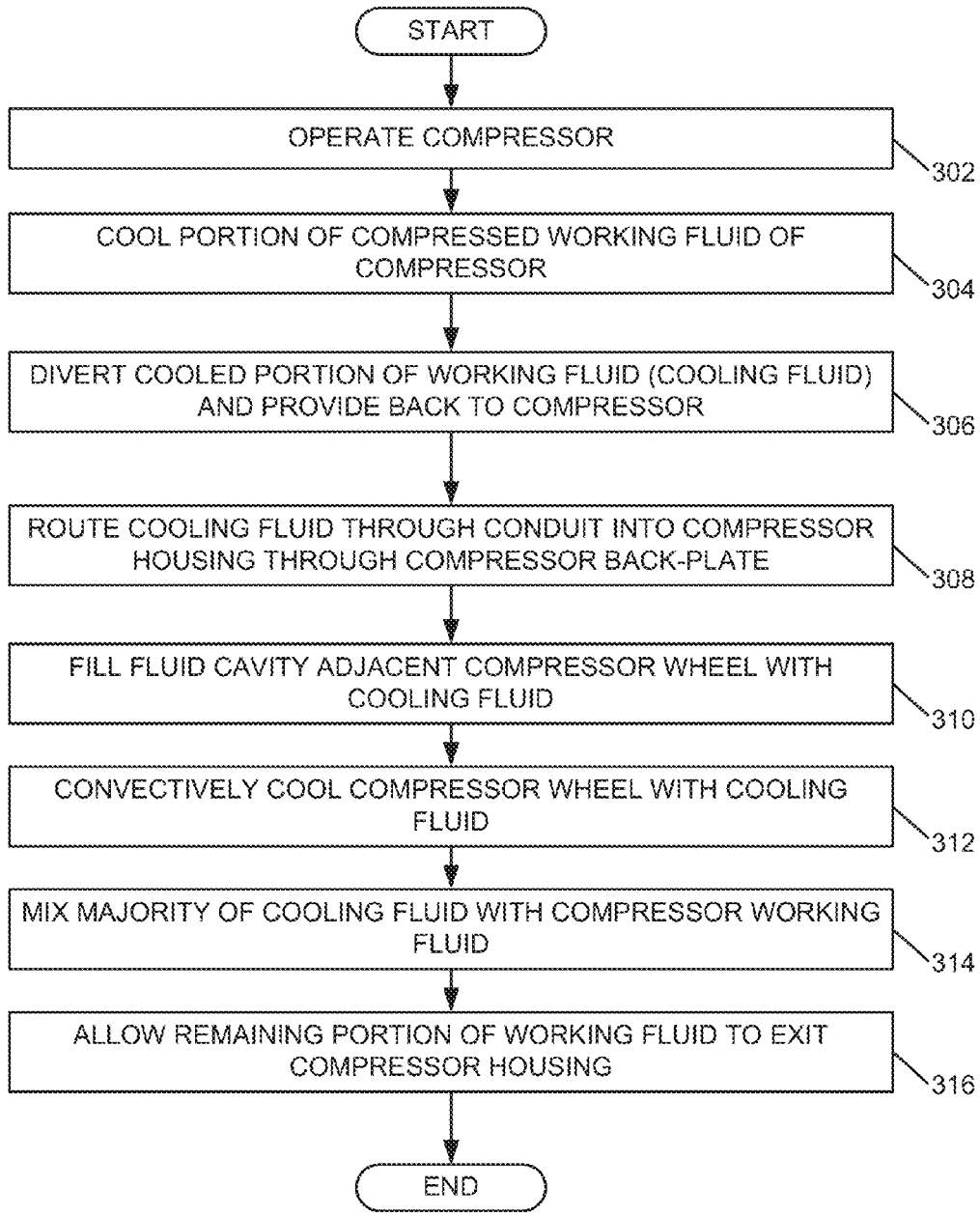
FIG. 12 is a flowchart for a method of cooling a compressor wheel in accordance with the disclosure.

A method for providing active cooling to a compressor wheel in accordance with the disclosure is shown in the flowchart of FIG. 12. Here, the compressor is operated at 302, which causes fluid compression and heating of the compressor wheel. At least a portion of the compressed fluid is cooled at 304. The portion of cooled compressed fluid, or cooling fluid, is diverted from the working fluid and provided at a metered rate back to the compressor at 306. The cooling fluid is thus routed at 308 through a conduit, which includes structures for metering and/or controlling the flow rate and/or pressure of the cooling fluid, to and through a back plate of the compressor. When in the compressor, the cooling fluid fills a cavity defined between the inboard or back side of the compressor wheel and the compressor back-plate at 310. From there, the cooling fluid is in contact with the compressor wheel and convectively cools the same at 312. After passing over the compressor wheel, a majority portion of the cooling fluid mixes with the working fluid at 314, and a remaining portion of the cooling fluid exits the compressor through a compressor shaft seal at 316.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for cooling a compressor wheel within a fluid compressor during compressor operation, comprising:
   cooling a portion of compressed working fluid of the compressor via an air cooler;
   diverting the portion of a compressed working fluid that was cooled to form a cooling flow from an intake collector;
   providing the cooling flow back to the compressor;
   routing the cooling flow through a conduit into a compressor housing through a backplate of the compressor housing at a low pressure region behind the compressor wheel at an angle of about 55 degrees with respect to a rotational axis of the compressor wheel;
   filling a fluid cavity adjacent the compressor wheel within the compressor housing with the cooling flow; and
   convectively cooling the compressor wheel with the cooling flow.

2. The method of claim 1, further comprising mixing a majority of the cooling flow with the compressed working fluid exiting from the compressor housing, and allowing a remaining portion of the working fluid to exit the compressor housing.

3. An internal combustion engine having an intake collector and an exhaust collector selectively fluidly connected to an engine cylinder, the internal combustion engine comprising:
   a compressor adapted to compress air or a mixture of air and to provide a compressed charge to the intake collector, said compressor including a housing surrounding a compressor wheel and a backplate connected to the housing, the backplate enclosing the compressor wheel within an interior space of the housing;
   a heat exchanger adapted to cool the compressed charge provided to the intake collector, said heat exchanger disposed between the compressor and the intake collector such that the intake collector is disposed downstream of the heat exchanger in the direction of flow of the compressed charge from the compressor to the intake collector;
   a cooling fluid conduit fluidly connected between the intake collector and the interior space of the housing of the compressor at a location between the compressor wheel and the backplate; and
   an internal passage formed in the backplate, through which the flow of compressed charge is provided, wherein the internal passage is disposed at an angle of about 55 degrees with respect to a rotational axis of the compressor wheel;
   wherein a pressure differential is created when the compressor is operating to draw compressed charge into the interior space of the housing from the cooling fluid conduit, said compressed charge passing over and convectively cooling said compressor wheel before mixing with a main compressor flow and being provided back to the heat exchanger.

4. The internal combustion engine of claim 3, further comprising a turbine associated with and configured to provide power to the compressor, said turbine and compressor being interconnected by a center housing.

5. The internal combustion engine of claim 3, wherein the location between the compressor wheel and the backplate into which the cooling fluid is provided is a low-pressure region disposed at a lower static pressure with respect to air present in the intake collector during operation of the compressor, and wherein the pressure differential is a difference in static pressure between the low-pressure region and an intake collector pneumatic pressure.

6. The internal combustion engine of claim 3, further comprising a flow control orifice disposed along the cooling fluid conduit, said flow control orifice being configured to meter the flow of compressed charge passing into the interior space of the housing so that said flow is below a predetermined portion of a total compressed charge flow provided by the compressor.

7. The internal combustion engine of claim 6, wherein the predetermined portion is at most 5% of the total compressed charge flow.

8. The internal combustion engine of claim 3, wherein the cooling fluid conduit is fluidly open at all times.

9. The internal combustion engine of claim 3, wherein an annular cavity is formed in the backplate along an annular region between the compressor wheel and the backplate, and wherein the flow of compressed charge passing into the compressor is provided by the cooling flow conduit directly into the annular cavity of the backplate.

10. The internal combustion engine of claim 3, wherein the flow of compressed charge provided to the compressor is configured to impinge onto a high stress area of the compressor wheel, said high stress area being disposed at a radial distance from a rotation axis of the compressor wheel that is about ¾ of a total outermost radial dimension of the compressor wheel.

11. A turbocharger for use with an internal combustion engine, the turbocharger interconnected between an intake collector and an exhaust collector of the internal combustion engine, the turbocharger comprising:
   a turbine;
   a compressor associated with the turbine, the compressor adapted to compress air or a mixture of air and to provide a compressed charge to the intake collector, said compressor including a housing radially surrounding a compressor wheel, and a backplate connected to the housing and enclosing the compressor wheel within an interior space of the housing;
   a cooling fluid conduit fluidly connected to the backplate of the compressor at a location between the compressor wheel and the backplate, said cooling fluid conduit adapted to provide a portion of the compressed charge provided by the compressor back to the compressor through the backplate thereof;
   an internal passage formed in the backplate, through which the flow of compressed charge is provided, wherein the internal passage is disposed at an angle of about 55 degrees with respect to a rotational axis of the compressor wheel;
   wherein a pressure differential is created between the location behind the compressor wheel and an outlet of the compressor, when the compressor is operating, to draw a flow of compressed charge into the interior space of the housing, said flow passing over and convectively cooling said compressor wheel before mixing with a main compressor flow and being provided back through the compressor outlet.

12. The turbocharger of claim 11, wherein the turbocharger is configured to operate with a heat exchanger disposed to cool the compressed charge before the portion thereof is provided back to the compressor through the cooling fluid conduit.

13. The turbocharger of claim 11, wherein the location between the compressor wheel and the backplate into which the cooling fluid is provided is a low-pressure region disposed at a lower static pressure with respect to the compressor outlet, and wherein the pressure differential is a difference in static pressure between the low-pressure region and the compressor outlet.

14. The turbocharger of claim 11, further comprising a flow control orifice disposed along the cooling fluid conduit, said flow control orifice being configured to meter the portion of the compressed charge passing into the interior space of the housing so that said flow is below a predetermined portion of a total compressed charge flow provided at the compressor outlet.

15. The turbocharger of claim 14, wherein the predetermined portion is at most 5% of a total compressed charge flow provided at the compressor outlet.

16. The turbocharger of claim 11, wherein the cooling fluid conduit is fluidly open at all times.

17. The turbocharger of claim 11, wherein an annular cavity is formed in the backplate along an annular region between the compressor wheel and the backplate, and wherein the flow of compressed charge passing into the compressor is provided by the cooling flow conduit directly into the annular cavity of the backplate.

18. The turbocharger of claim 11, wherein the flow of compressed charge provided to the compressor is configured to impinge onto a high stress area of the compressor wheel, said high stress area being disposed at a radial distance from a rotation axis of the compressor wheel that is about ¾ of a total outermost radial dimension of the compressor wheel.

* * * * *